(12) United States Patent
Rens et al.

(10) Patent No.: US 9,496,768 B2
(45) Date of Patent: Nov. 15, 2016

(54) ELECTRICAL MACHINES

(75) Inventors: Jan Jozef Rens, Sheffield (GB); Kais Atallah, Sheffield (GB)

(73) Assignee: Magnomatics Limited (GB)

( * ) Notice: Subject to any disclaimer, the term of this patent is extended or adjusted under 35 U.S.C. 154(b) by 313 days.

(21) Appl. No.: 12/995,789

(22) PCT Filed: May 29, 2009

(86) PCT No.: PCT/GB2009/001363
§ 371 (c)(1),
(2), (4) Date: Mar. 21, 2011

(87) PCT Pub. No.: WO2009/147377
PCT Pub. Date: Dec. 10, 2009

(65) Prior Publication Data
US 2011/0163623 A1    Jul. 7, 2011

(30) Foreign Application Priority Data

Jun. 3, 2008   (GB) .................................. 0810096.8

(51) Int. Cl.
| | |
|---|---|
| *H02K 7/11* | (2006.01) |
| *H02K 49/10* | (2006.01) |
| *H02K 51/00* | (2006.01) |
| *H02K 7/18* | (2006.01) |

(52) U.S. Cl.
CPC .............. *H02K 7/11* (2013.01); *H02K 49/102* (2013.01); *H02K 51/00* (2013.01); *H02K 7/1838* (2013.01); *Y02E 10/725* (2013.01)

(58) Field of Classification Search
CPC ................ H02K 49/102; H02K 49/104; H02K 49/106; H02K 49/108; H02K 16/00–16/04

USPC ................................. 310/103, 112, 114, 266
See application file for complete search history.

(56) References Cited

U.S. PATENT DOCUMENTS

| | | | |
|---|---|---|---|
| 4,011,489 A | * | 3/1977 | Franz et al. .................. 318/798 |
| 5,633,555 A | | 5/1997 | Ackermann et al. |
| 5,744,895 A | * | 4/1998 | Seguchi et al. ............... 310/266 |
| 5,994,809 A | | 11/1999 | Ackermann |

(Continued)

FOREIGN PATENT DOCUMENTS

| | | |
|---|---|---|
| EP | 1315274 | 5/2003 |
| EP | 1843454 | 10/2007 |

(Continued)

OTHER PUBLICATIONS

Atallah et al., "A Novel High-Performance Magnetic Gear", IEEE Transactions on Magnetics, Jul. 2001, 37(4), 2844-2846.

(Continued)

*Primary Examiner* — Thomas Truong
(74) *Attorney, Agent, or Firm* — Dorsey & Whitney LLP

(57) ABSTRACT

Embodiments provide an electrical machine, comprising: first and second moveable elements arranged to interact in a magnetically geared manner via a magnetic field created, at least in part, by a first electrical winding arrangement associated with the first moveable element; and a second electrical winding arrangement which is arranged to interact magnetically with a fundamental harmonic of a magnetic field created by the first electric winding arrangement associated with the first moveable element.

17 Claims, 7 Drawing Sheets

(56) References Cited

U.S. PATENT DOCUMENTS

| | | | |
|---|---|---|---|
| 6,590,312 B1 * | 7/2003 | Seguchi et al. | 310/266 |
| 6,998,757 B2 * | 2/2006 | Seguchi et al. | 310/266 |
| 7,982,351 B2 * | 7/2011 | Atallah et al. | 310/114 |
| 2004/0108781 A1 | 6/2004 | Razzell et al. | |
| 2004/0251764 A1 | 12/2004 | Groening | |
| 2005/0242759 A1 * | 11/2005 | Fujino et al. | 318/432 |
| 2006/0186749 A1 * | 8/2006 | Strydom | 310/103 |
| 2007/0186692 A1 | 8/2007 | Waszak et al. | |

FOREIGN PATENT DOCUMENTS

| | | |
|---|---|---|
| FR | 1560584 | 3/1969 |
| GB | 2437568 | 10/2007 |
| WO | 9622630 | 7/1996 |
| WO | 2007064591 | 6/2007 |
| WO | WO 2007125284 A1 * | 11/2007 |

OTHER PUBLICATIONS

Atallah et al., "Design, Analysis and Realisation of a High Performance Magnetic Gear", IEEE Proceedings-Electric Power Applications, 2004, 151, 135-143.

* cited by examiner

ELECTRICAL MACHINES

CROSS REFERENCE TO RELATED APPLICATIONS

This application claims the benefit of International Application No. PCT/GB2009/001363 filed May 29, 2009, having a claim of priority to GB patent application number 08 10096.8, filed Jun. 3, 2008.

FIELD OF THE INVENTION

The present invention relates to electrical machines.

BACKGROUND TO THE INVENTION

Mechanical gearboxes are extensively used to match the operating speed of prime-movers to the requirements of their loads for both increasing the rotational speed such as, for example, in wind-powered generators or reducing rotational speed such as, for example, in an electric-ship propulsion arrangement. It is usually more cost and weight effective to employ a high-speed electrical machine in conjunction with a mechanical gearbox to achieve requisite speed and torque characteristics. However, while such a high-speed electrical machine in conjunction with a mechanical gearbox allows high system torque densities to be realised, such mechanical gearboxes usually require lubrication and cooling. Furthermore, reliability can also be a significant issue. Consequently, direct drive electrical machines are employed in applications where a mechanical gearbox cannot be used. Some direct drive electrical machines, such as permanent magnet rotary/linear homopolar (transverse-field) machines (TFM) have poor power factors which make them unsuitable for electrical power generation and require higher converter volt-ampere ratings for motor applications.

Recently, pseudo-direct drive electrical machines have been proposed which provides at least one stator and two moveable elements, such as inner and outer rotors, which interact in a magnetically geared manner via asynchronous harmonics of first and second pluralities of permanent magnets. Such assemblies are described in various embodiments in GB 2 437 568 and U.S. 2004/0108781 which are incorporated herein by reference.

However, such apparatus are required to be designed to be capable of producing a peak torque, dependent upon their intended application, even when typical torque levels to be produced may be significantly lower. Such designed-to-accommodate-peak-torque apparatus are physically large, and consequently expensive to manufacture. Further, such designed-for-peak-torque apparatus have relatively high iron losses formed by a combination of eddy current and hysteresis losses. Finally, the emf that is generated in the windings which are attached to the stator is a function of the speed of the rotors, and cannot be changed to, for example, provide reactive power to the terminals of the electrical machine. It is therefore not possible to directly connect the prior art electrical machine as a generator to the electrical supply grid. It is an object of embodiments of the present invention to at least mitigate one or more of the above prior art problems.

SUMMARY OF INVENTION

Accordingly, a first aspect of embodiments of the present invention provides an electrical machine, comprising first and second moveable elements arranged to interact in a magnetically geared manner via a magnetic field created, at least in part, by a first electrical winding arrangement associated with the first moveable element; and a second electrical winding arrangement which is arranged to interact magnetically with a fundamental harmonic of a magnetic field created by the first electric winding arrangement associated with the first moveable element.

A second aspect of embodiments of the present invention provides an electrical machine comprising a set of electromagnets, a plurality of pole-pieces and a set of permanent magnets arranged in a magnetically geared manner; and a winding arranged to interact with a fundamental space harmonic of the set of electromagnets.

A third aspect of embodiments of the present invention provides an electrical machine comprising a first moveable element and a second moveable element arranged to interact in a magnetically geared manner via asynchronous harmonics of a plurality of electromagnets associated with the first moveable element and a plurality of permanent magnets, and a winding arranged to interact magnetically with a fundamental harmonic of a magnetic field of the plurality of electromagnets.

A fourth aspect of embodiments of the present invention provides a method of operating an electrical machine comprising the steps of producing a magnetically motivated geared interaction between first and second moveable elements of the electrical machine by electrically generating a magnetic field associated with the first moveable element; modulating a magnetic field associated with the first moveable element; and energising a winding arranged to interact with the magnetic field associated with the first moveable element.

Another aspect of the present invention provides an electrical machine comprising first and second moveable elements that interact in a magnetically geared manner and a winding arranged to interact with the first/fundamental harmonic of the magnetic field of the first plurality of permanent magnets associated with the first moveable element.

Another aspect of the present invention may provide an electrical machine, comprising an inner moveable element and an outer moveable element arranged to interact in a magnetically geared manner via a plurality of electromagnets associated with the inner moveable element; and a winding outwardly disposed relative to at least the inner moveable element arranged to interact magnetically with a fundamental harmonic of magnetic field of the plurality of electromagnets associated with the inner moveable element.

A still further aspect of the present invention provides an electrical machine comprising a first rotor/translator having an associated set of electromagnets exhibiting a respective first number of pole-pairs; a set of permanent magnets having a respective second number of pole-pairs such the first and 25 second numbers of pole-pairs are different; a plurality of pole-pieces arranged to modulate the fields of the sets of electromagnets and permanent magnets to produce mutually matching pole-pairs enabling magnetic coupling and hence torque transmission, between the sets of electromagnets and permanent magnets; and a winding selected to magnetically couple with a first harmonic of the electromagnets of the first rotor/translator.

Preferably, the plurality of electromagnets is arranged about the inner moveable element to rotate therewith.

The electromagnets are arranged to be energised by an AC or DC supply to create a desired magnetic field.

The electromagnets may be arranged within recesses or blind-apertures of a moveable member.

The electromagnets may be arranged in pairs. The pairs may be arranged in perpendicular or stacked relation.

A controller may be arranged to vary a magnetic flux generated by the electromagnets. Preferably, the controller controls the flux or magnetic field by controlling a current I in the electromagnets. The controller may control the flux to reduce copper losses in the machine. The controller may maintain a load angle within 60-120°. Preferably, the load angle is maintained around 90°.

One moveable element may further comprise one or more permanent magnets and electromagnets formed by windings or coils. The permanent magnets may be arranged to have a magnetic flux sufficient to couple to the other moveable element at a nominal torque level.

Advantageously, electrical or electromechanical machines according to embodiments of the present invention can produce significantly more torque for a period of time than would otherwise be possible with a prior art machine of comparable size. Electrical or electromechanical machines according to embodiments of the present invention may be physically smaller and cheaper to produce than prior art electrical or electromechanical machines, due to being designed to accommodate a nominal torque level encountered throughout a majority of an operating period. Further, iron losses can be reduced by decreasing a magnetic flux in the machine. Still further, a level of magnetic field and hence induced electromagnetic field (EMF) in a stator winding may be controlled.

Electrical or electromechanical machines according to embodiments of the present invention are particularly suited to applications having a high ratio of peak torque to nominal torque. For example, a wind turbine typically operates for long durations partly loaded, Le. at nominal torque, in comparison with operating durations at peak torque and would benefit from use of an electrical or electromechanical machine according to embodiments of the present invention having a physically reduced size and lower manufacturing cost, yet which is capable of handling peak torque for the short periods of time for which it is encountered. Further, the advantageous effects according to embodiments of the present invention are more prevalent in machine having a larger diameter, such as found in wind turbines and like electricity generation apparatus.

As a result of advantages of embodiments of the present invention, the invention will be better suited than the prior-art machine for machines where a large torque is required, such as power generation, ship propulsion, train traction, mining applications etc.

Further aspects of the present invention are defined in the appended claims.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
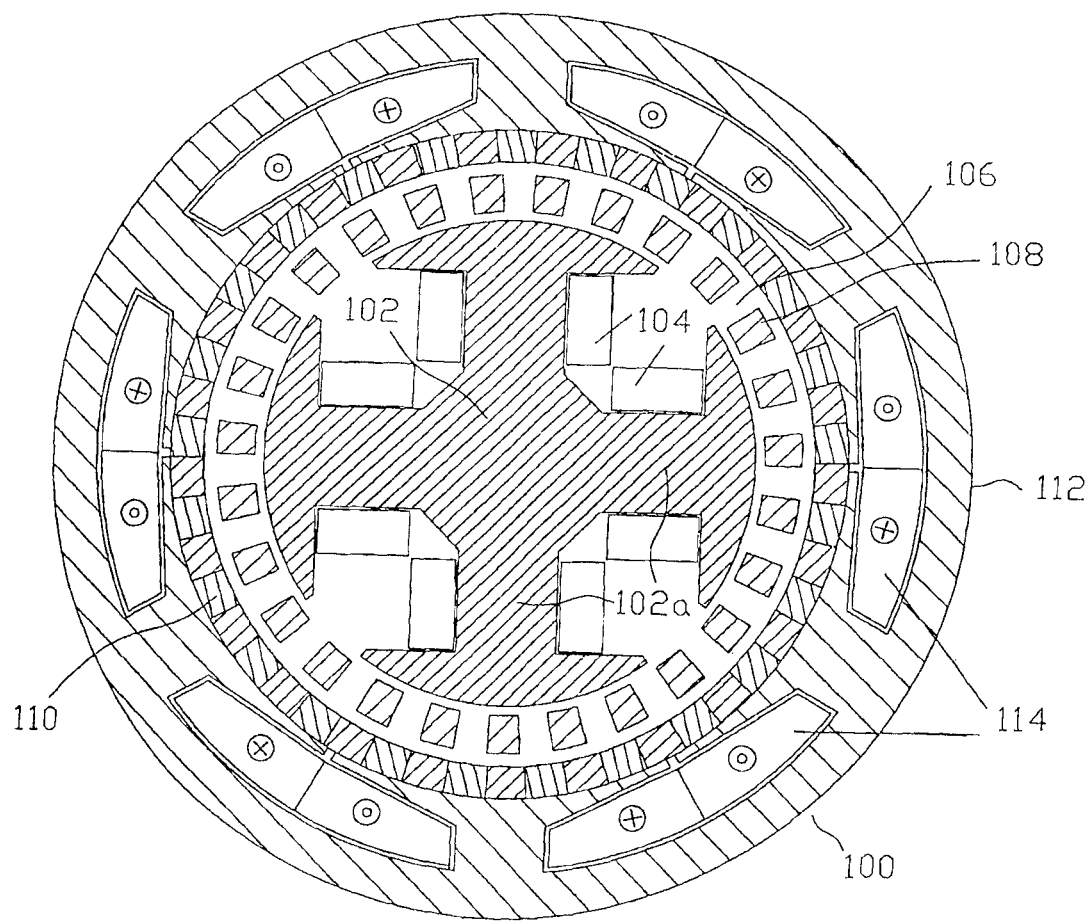
FIG. 1 shows schematically an assembly comprising an electrical machine combined with a magnetic gear according to a first preferred embodiment.

FIG. 1 shows an electrical machine 100 according to a first preferred embodiment of the present invention. The electrical machine 100 comprises an inner rotor 102 bearing a number of electrical windings 104 which form electromagnets. The windings 104 are fitted or wound around salient teeth 102a of the inner rotor 102, such that each tooth 102a forms a magnetic pole when the respective winding 104 is supplied with a current.

The windings 104 are arranged to be electrically energised via one or more of slip rings, a rotating supply or a transformer due to being mounted upon the rotatable inner rotor 102. When energised with an electrical current/the windings 104 create a magnetic field having a required number of poles. In the shown embodiment, the windings 104 are arranged to form a magnetic field having four magnetic poles although it will be realised that other numbers and arrangements of windings may be provided to provide other numbers of pole-pairs.

The electrical machine 100 comprises an outer rotor 106 carrying a number of ferromagnetic pole-pieces 108. In the illustrated embodiment, the outer rotor 106 carries 27 pole-pieces 108 that enable magnetic coupling using asynchronous harmonics between the windings 104 of the inner rotor 102 and a number of permanent magnets 110 that are mounted to a fixed stator 112. The stator 112 has 6 teeth around which 6 coils 114 are concentrically wound to form a 3-phase winding.

The stator windings 114 magnetically couple with a fundamental harmonic of the inner rotor windings 104 so that a torque is applied on the inner rotor 102. In preferred embodiment, the stator winding 114 is 3-phase and is arranged into 6 slots, but can equally well be some other type of winding such as, for example, 2-phase windings with 4 slots. The embodiment illustrated comprises 50 poles of permanents magnets 110 disposed on an interior periphery of the stator 112. One skilled in the art understands that the crosses and points depicted with respect to the stator winding 114 illustrate the polarity of the current through the coils. The pole-pieces 108 of the outer rotor 106 are arranged to provide gearing between the inner rotor 102 and the outer rotor 106. In preferred embodiments, the gearing is such that the inner rotor 102 is a relatively high-speed rotor and the outer rotor 106 is a relatively low speed rotor. The shown embodiment has a gear ratio of 13.5:1.

The pole-pieces 108 are used to allow the fields of the permanent magnets 110 and the inner rotor windings 104 to interact. The pole-pieces 108 modulate the magnetic fields of the permanent magnets 110 and those of the inner rotor windings 104 so they interact to the extent that rotation of one rotor will induce rotation of the other rotor in a geared manner. Rotation of the first rotor 102 at a speed $\omega_1$ will induce rotation of the second rotor 106 at a speed $\omega_2$ where $\omega_1 > \omega_2$ and vice versa.

When the electrical machine acts as a motor, the stator windings are supplied with currents from an electrical supply to cause rotation of the first rotor 102. The first rotor 102 is not necessarily connected to the load. The outer pole-piece rotor 106 is connected to an output shaft of the motor and rotates at a lower speed relative to the first rotor 102. The gearing down of speed also leads to a gearing up of torque that is produced by the interaction of the stator winding 114 and the fundamental harmonic of the field produced by inner rotor windings 104. The outer pole-piece rotor 106 is connected to the mechanical load via the output shaft. Such a motor is ideal for driving high torque, low speed loads such as propeller shafts in marine propulsion systems.

When the electrical machine acts as a generator the pole-piece rotor 106 is connected to a prime-mover via an input shaft. The outer permanent magnet rotor and input shaft of the generator are typically driven at a low speed which through the magnetic gearing causes the first rotor 102 to rotate at a higher speed relative to the input rotor 106. The gearing up of speed leads to a gearing down of the torque that must be reacted by the interaction of the stator winding 114 and the fundamental harmonic of the field produced by the inner rotor windings 104. The first rotor 102 is not necessarily externally connected. The rotation of the first rotor 102 induces voltages in the stator windings which are connected to a power electronic converter or direct to an electrical load or the electrical grid to deliver electrical power. Such a generator is ideal for being driven by high torque, low speed prime-movers such as wind turbines.

One skilled in the art understands how to select and design the pole-pieces 108, given the permanent magnets 110 and windings 104, to achieve the necessary magnetic circuit or coupling such that gearing between the first 102 and second 106 rotors results, as can be appreciated from, for example, K. Atallah, D. Howe, "A novel high-performance magnetic gear", IEEE Transactions on Magnetics, Vol. 37, No.4, pp. 2844-2846, 2001 and K. Atallah, S. D. Calverley, D. Howe, "Design, analysis and realisation of a high performance magnetic gear", IEE Proceedings—Electric Power Applications, Vol. 151, pp. 135-143, 2004, and GB 2 437 568 which are incorporated herein by reference for all purposes.

Figure 2:
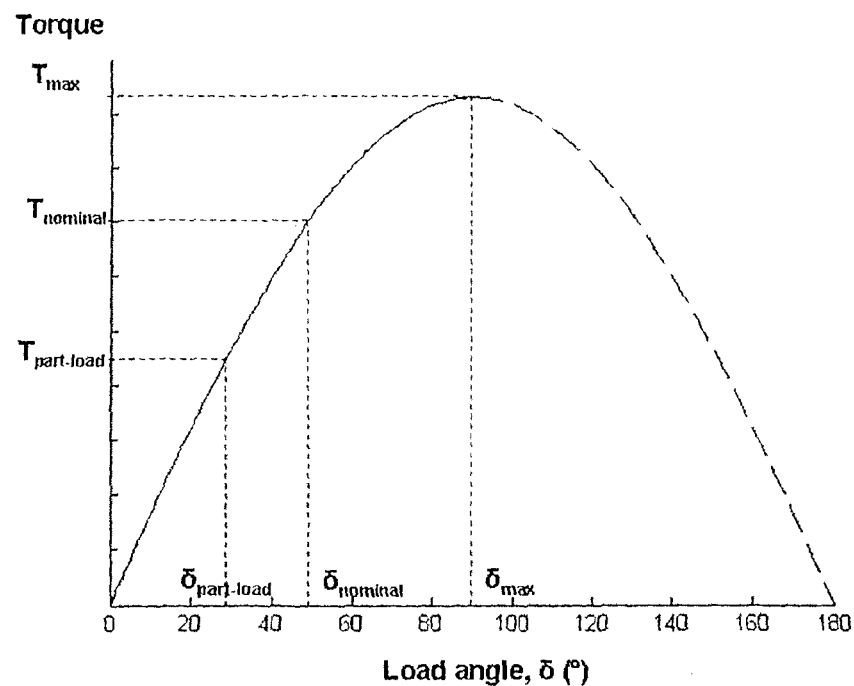
FIG. 2 shows a graph of torque against load-angle for a prior art pseudo-direct drive.

Referring to FIG. 2, a load angle I) is an electrical angle between a magnetic field produced by the inner rotor windings 104 and the harmonic of a magnetic field created by the outer magnet array 110 that has the same number of poles as the magnetic field that is produced by the windings 104. The torque which acts on the output rotor 106 of a pseudo-direct drive is a sinusoidal function of the load-angle at which the pseudo-direct drive operates, i.e. the load angle will automatically re-adjust when the torque on 10 the output shaft is varied. As is well understood from the theory of synchronous machines, the magnetic gear operates at a stable operating point when the load angle is smaller than 90°, shown on the left hand side of the graph. At maximum torque transmission $T_{max}$, the machine will operate with a load angle of 90°. If a torque is applied to the output rotor 106 which is greater than $T_{max}$, the low-speed outer rotor 106 will slip relative to the high-speed inner rotor 102. The left-hand side of the graph shows stable operating points whilst the right-hand side shows instable operating points in dashed form, the principle being understood in relation to stability theory of synchronous generators.

A prior art pseudo-direct drive electrical machine must be designed to accommodate the greatest torque which will be encountered in operation, even if this torque is rarely produced. At nominal load, $T_{nominal}$, the input torque is smaller than $T_{max}$ and the pseudo-direct drive operates at a smaller load angle $\delta_{nominal}$. The height of the sinusoidal relationship, and thus the maximum torque which can be generated, is dependent on the flux in the pseudo-direct drive and is consequently fixed in a prior art pseudo-direct drive.

Figure 3:
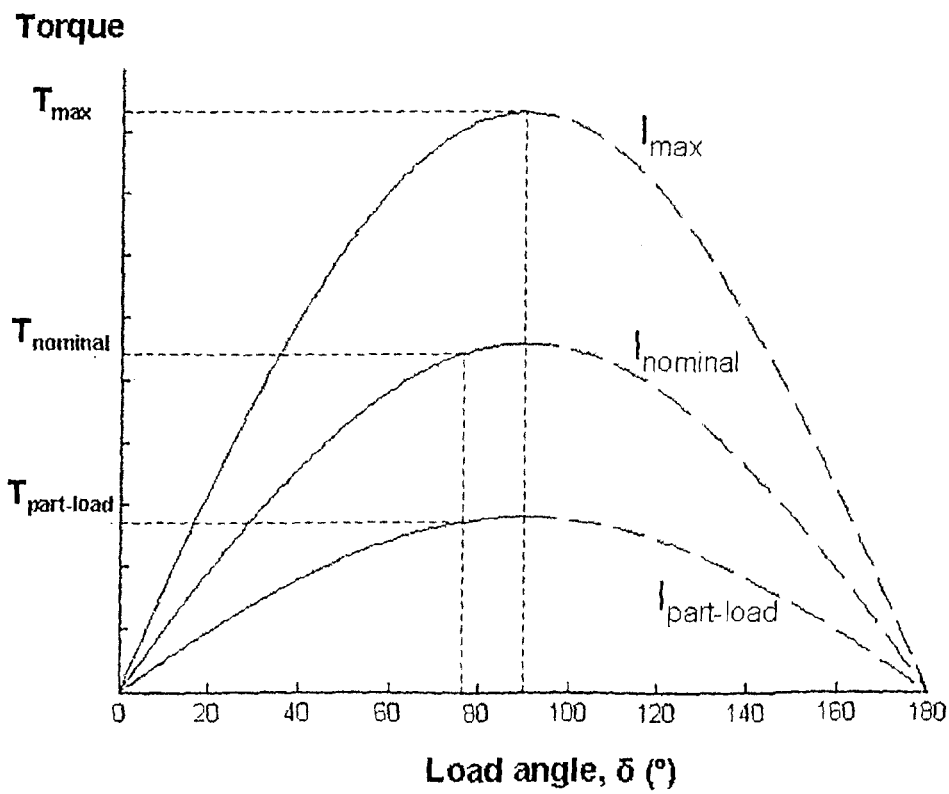
FIG. 3 shows a graph of torque against load-angle for embodiments of the present invention.

FIG. 3 shows torque against load angle for embodiments of the present invention. In embodiments of the present invention, a current I in the inner rotor windings 104 can be controlled by a controller (not shown) such that the machine operates with a load angle which is within the stable operating region but close to 90° for any desired torque. The maximum torque that can be produced is given by a function of the maximum electrical current of the windings 104 and a duration for which this peak torque is applied since overheating must be considered if a high winding current is applied for an extended period. At part-load, the electrical current in the windings 104 is reduced by the controller, such that the load-angle is maintained as close to 90° as is desirable in the application where the machine is used. Advantageously, the flux in the machine is also reduced so that iron-losses are consequently reduced and are smaller than they would be in the prior art gear. A reduction of the current in the windings in order to operate at an increased load-angle further has the advantage of reducing the copper losses which are generated in the windings. An electrical machine according to embodiments of the present invention can be designed for nominal operating torque $T_{nominal}$, which therefore allows the machine to be smaller than one comprising only permanent magnets, which must be designed to transmit the peak torque $T_{max}$.

Figure 4:
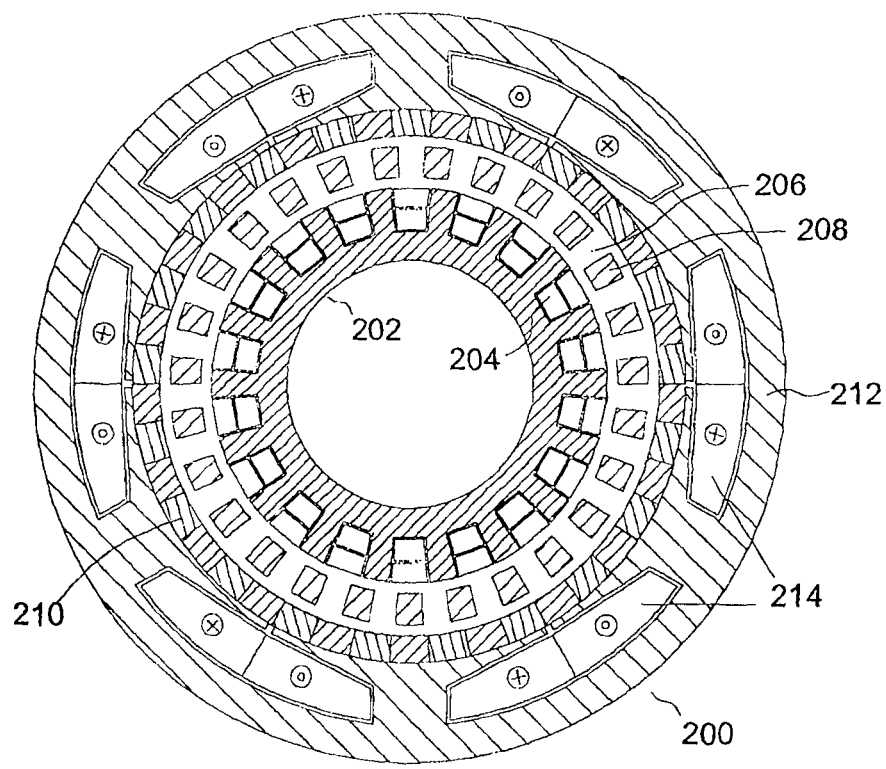
FIG. 4 depicts schematically a combined electrical machine and magnetic gear according to a second preferred embodiment.

FIG. 4 shows a second preferred embodiment of the present invention. Unless otherwise described, the second embodiment is identical in construction and operation to the first embodiment and comprises like parts.

The second embodiment 200 replaces the salient poles with concentrated windings on the inner flux-producing member of the first embodiment with a plurality of distributed windings which are fitted in a number of slots distributed around an inner rotor. The windings are arranged in layers in the open slots.

The shown second embodiment comprises a winding which is configured to produce a magnetic field with 2 pole-pairs. However, it will be realised that other winding configurations which generate a different number of poles may be envisaged. The current supplied to the windings by a controller may be DC or AC. When the current is AC the magnetic field moves at a different speed compared to the mechanical speed of the rotor.

The second embodiment may be used in applications where the inner rotor 202 rotates at high-speed. This results from the inner rotor 202 being more aerodynamic than the corresponding design of the first embodiment.

Figure 5:
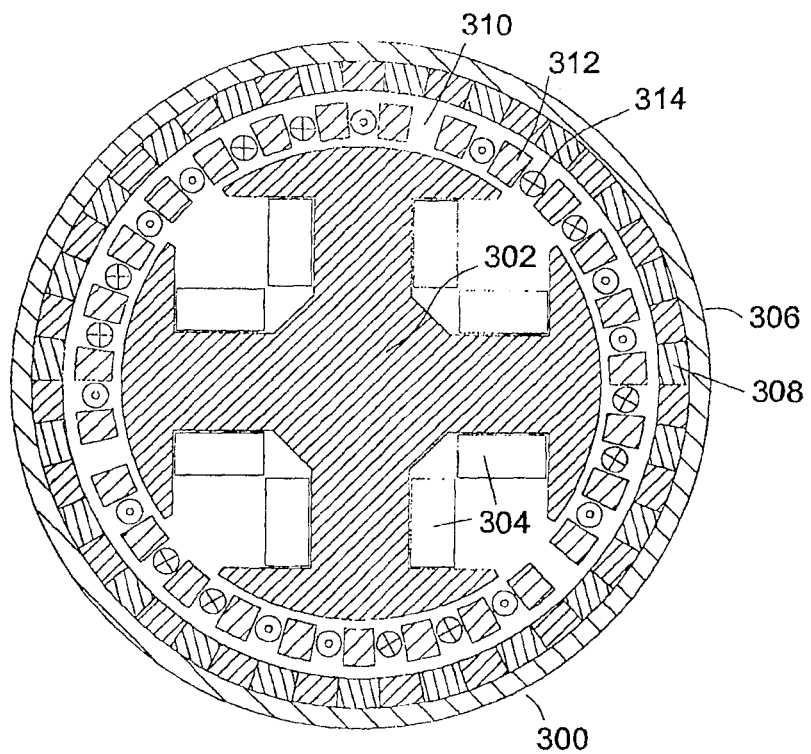
FIG. 5 depicts a combined electrical machine and magnetic gear according to a third preferred embodiment.

FIG. 5 shows an electrical machine 300 according to a third embodiment.

The electrical machine 300 comprises an inner rotor 302 bearing a plurality of electrical windings 304 forming electromagnets, as in the first embodiment 100. In the illustrated embodiment 300, windings forming 4 magnetic poles are illustrated but some other number of windings forming another number of poles could equally well be used.

The electrical machine 300 comprises an outer rotor 306 bearing a plurality of permanent magnets 308. In the illustrated embodiment, permanent magnets 308 having 23 pole-pairs form part of the outer rotor 306. However, the outer rotor could produce a magnetic field which has some other number of poles. The electrical machine 300 comprises a stationary armature 310 bearing a plurality of pole-pieces 312 and a 3-phase winding 314. The number of pole-pieces 312 in the embodiment is 27, although some other number of pole-pieces 312 can be used in other embodiments. It should be noted that the embodiment has been illustrated using a 3-phase winding 314. However, embodiments are not limited thereto. Embodiments can be realised that use some other windings such as, for example, a two phase winding. The second/outer rotor 306 forms a relatively low speed rotor that is magnetically coupled, in a geared manner, with the relatively high-speed first/inner rotor 302 via asynchronous harmonics, which are created by modulation by the static pole-pieces 312 of the flux which that is produced by the inner and outer 5 rotors. One skilled in the art understands that the gear ratio is 13.5:1 and is related to the number of pole-pairs on the inner rotor 302 and the number of pole-pieces. It will be appreciated that applying a current to the 3-phase windings 314 will cause the high-speed rotor 302 to rotate, which, in turn, will also cause the low speed rotor 306 to rotate. Again, it can be appreciated that the windings 314 couple with the first harmonic associated with the magnetic field of windings 304 of the first/inner rotor 302 to establish electromechanical energy conversion, with a torque density comparable to TFMs, but with much higher power factor.

When the electrical machine acts as a motor the stator windings are supplied with currents from an electrical supply to cause rotation of the first rotor 302. The first rotor 302 is not necessarily connected to the load. The outer permanent magnet rotor is connected to an output shaft which then rotates at a low speed relative to the first rotor 302. The gearing down of speed also leads to a gearing up of torque that is produced by the interaction of the stator winding 314 and the fundamental harmonic of the field produced by inner rotor windings 304. The outer permanent magnet rotor 306 is connected to mechanical load via an output shaft. Such a motor is ideal for driving high torque, low speed loads such as propeller shafts in marine propulsion systems.

When the electrical machine acts as a generator, the outer permanent magnet rotor 306 is connected to a prime-mover via an input shaft. The outer permanent magnet rotor and input shaft of the generator are typically driven at a low speed which, through the magnetic gearing, causes the first rotor 302 to rotate at a higher speed relative to the input rotor 306. The gearing up of speed leads to a gearing down of the torque that must be reacted by the interaction of the stator winding 314 and the fundamental harmonic of the field produced by the inner rotor windings 304. The first rotor 302 is not necessarily externally connected. The rotation of the first rotor 302 induces voltages in the stator windings which are connected to a power electronic converter or direct to an electrical load or the electrical grid to deliver electrical power. Such a generator is ideal for being driven by high torque, low speed prime-movers such as wind turbines.

Figure 6:
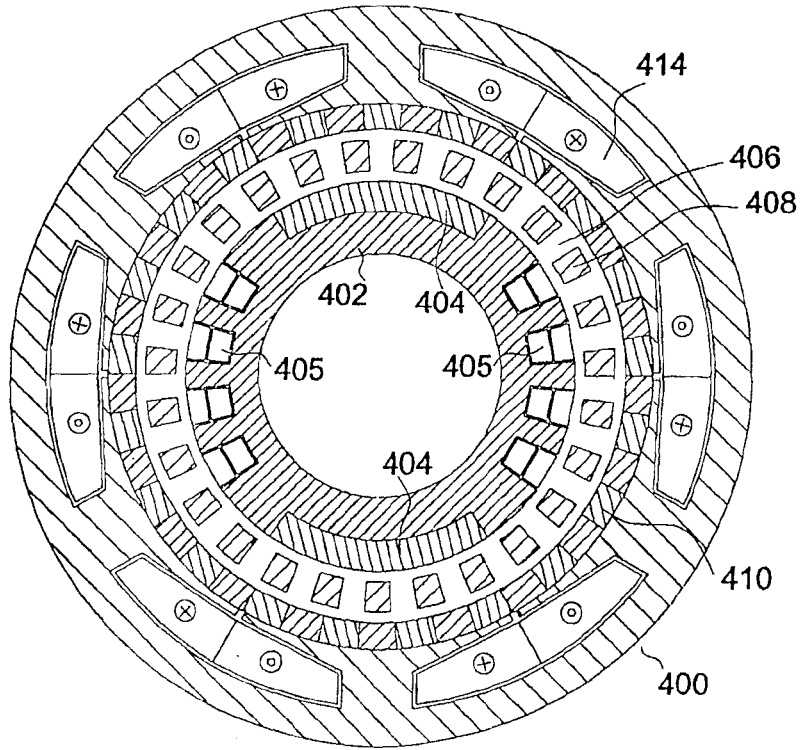
FIG. 6 depicts a combined electrical machine and magnetic gear according to a fourth preferred embodiment.

FIG. 6 shows a fourth preferred embodiment 400 of an electrical or electromechanical machine according to the present invention. The fourth embodiment 400 is similar to the second preferred embodiment 200 shown in FIG. 4, and is consequently also related to the first preferred embodiment 100. Unless otherwise described, parts shown in the drawings and not referenced below are the same as the second and first embodiments.

The fourth embodiment 400 comprises a rotatable inner rotor 402 carrying a combination of permanent magnets 404 and windings 405 forming electromagnets. The number and configuration of the permanent magnets is arranged such that the flux from the permanent magnets 404 is sufficient to drive the machine for some nominal torque i.e. to couple the inner rotor 402 and an outer rotor 406 in geared relation without current flowing in the windings 405. The controller is arranged to selectively energise the windings 10 405 when a greater than nominal torque is required to be produced. For example, the controller would energise the windings 405 when peak torque is required to be produced. Thus the advantages of the present invention i.e. reduced size could be achieved with lower power consumption.

Figure 7:
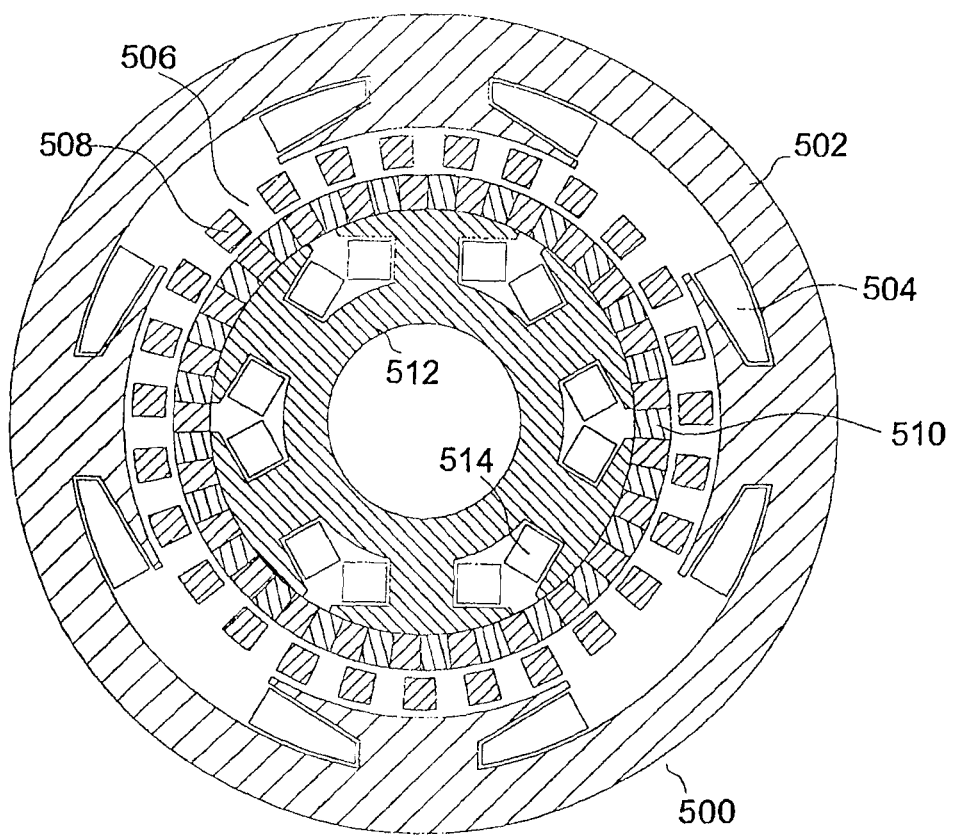
FIG. 7 shows a combined electrical machine and magnetic gear according to a fifth preferred embodiment.

FIG. 7 shows a fifth preferred embodiment 500 of an electrical or electromechanical machine according to the present invention. The fifth embodiment 500 is similar to the first preferred embodiment 100 shown in FIG. 1, with the difference that various components take up different relative positions within the machine. Unless otherwise described, parts shown in the drawings and not referenced below are the same as in the first embodiment.

The electrical machine 500 comprises an outer rotor 502 bearing a number of electrical windings 504 which form electromagnets. In the shown embodiment, the windings 504 are arranged to form a magnetic field having four magnetic poles although it will be realised that other numbers and arrangements of windings may be provided to provide other numbers of pole-pairs. The electrical machine 500 further comprises an inner rotor 506 carrying a number of ferromagnetic pole-pieces 508. A fixed stator 512 is disposed inwards of the inner rotor 506, and a number of permanent magnets 510 are mounted on the fixed stator 512. The stator 512 has 6 teeth around which 6 coils 514 are concentrically wound around to form a 3-phase winding.

It can be seen that the shown embodiment differs from the embodiment shown in FIG. 1, in that the stator 512 is disposed inwardly of the rotors 502, 506 and the high speed rotor 502 is disposed outwardly of the rotor 506 which carries the pole-pieces 508, i.e. the most inward component in the first embodiment becomes the most outward component in the fifth embodiment, etc. It will further be understood by those skilled in the art that any of the shown embodiments in FIG. 3, 4, 5, 6 and those shown in subsequent figures can be implemented by changing the relative positions of the various components, i.e. by re-positioning the most inward component to become the most outward component etc.

Figure 8:
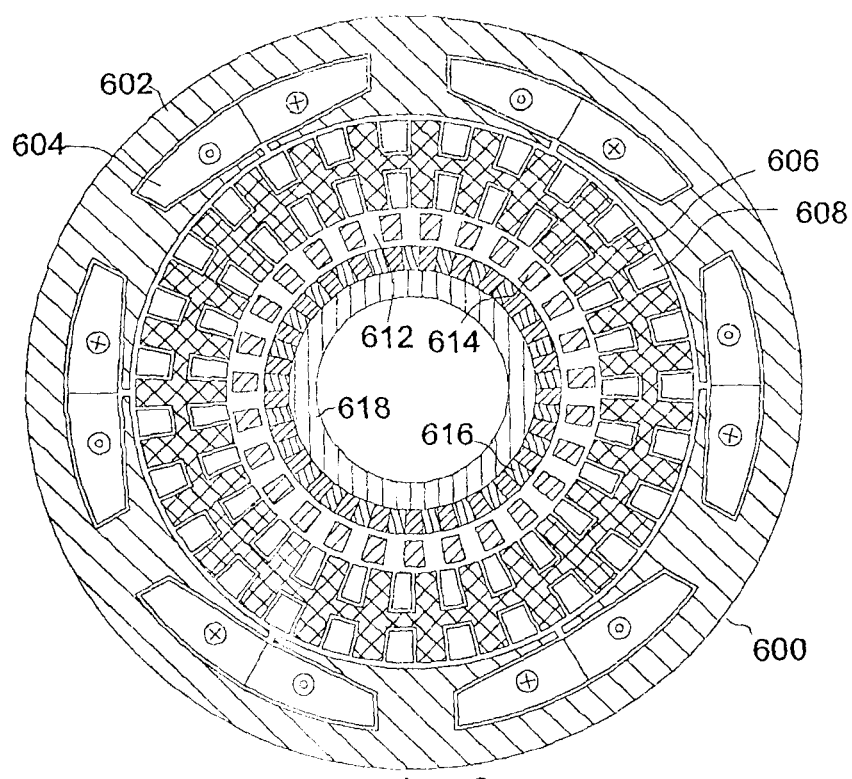
FIG. 8 shows a combined electrical machine and magnetic gear according to a sixth embodiment.

FIG. 8 shows a sixth embodiment 600 of an electrical or electromechanical machine according to the present invention. The electrical machine 600 comprises an outer stator 602 which has 6 teeth. Coils are wound around each tooth, such that the combination of all the stator coils forms a 4 pole, 3-phase winding 604. The electrical machine 600 further comprises an outer rotor 606, which is the high-speed rotor, and which has a number of slots on its inner and outer surfaces. A plurality of electrical conductors are fitted in the slots and combined to form electrical windings 608, which are arranged to be electrically energised via one or more of slip rings, a rotating supply or a transformer due to being mounted upon the rotatable outer rotor 606. When energised with an electrical current I the windings 608 create a magnetic field having a predetermined number of poles. In the shown embodiment, the windings 608 are arranged to form a magnetic field having four magnetic poles although it will be realised that other numbers and arrangements of windings may be provided to provide other numbers of pole-pairs.

The electrical machine 600 further comprises an inner rotor 612 carrying a number of ferromagnetic pole-pieces 614. In the illustrated embodiment, the rotor 612 carries 27 pole-pieces 614 that enable magnetic coupling using asynchronous harmonics between the winding 608 of the outer rotor 606 and a number of permanent magnets 616 that are mounted to a fixed inner stator 618. As explained in relation to previous embodiments, the permanent magnets 616 on the internal stator 618 may be replaced by electromagnets or a combination of permanent magnets and electro-magnets.

It will be understood by those skilled in the art that the operation of the sixth embodiment is identical to that of the other embodiments previously shown. The topology of the sixth embodiment is similar to the fifth embodiment shown in FIG. 7, with the difference that the internal stator 512 in the fifth embodiment 500 has been split into an internal stator 618 and an external stator 602 in the sixth embodiment 600. It will further be understood that the winding 608 on the outer rotor 606 of the sixth embodiment can be configured in a number of different topologies. For example, the winding may be situated on the outer surface or on the inner surface only, and it may be configured in a concentrated or a distributed winding. The winding 608 which is shown in FIG. 8, which is fitted in slots which are situated on both the outer and inner surfaces of the rotor 606, may produce a magnetic field on the outer surface of the rotor 606 which has a different number of poles than the magnetic field which it produces on the inner surface of the rotor 606, or it may produce the a magnetic field with the same number of poles on both sides of the rotor 606. The outer rotor 606 may also carry permanent magnets in combination with the electrical winding 608, such that the magnetic field that is produced by the outer rotor 606 is a combination of the magnetic field produced by the electrical winding and the magnetic field produced by the electrical winding 608.

The embodiment shown in FIG. 8 has been described as having an internal stator 618 containing a plurality of permanent magnets 616 and a low-speed output rotor 612 which carries a plurality of pole-pieces 614. The present invention also extends to embodiments in which the plurality of permanent magnets 616 is taken as the low-speed output rotor, whilst the plurality of pole-pieces 614 constitutes the stator.

The present invention also extends to embodiments as described with reference to the sixth embodiment, but in which various components take up a different position in the machine compared to the embodiment shown in FIG. 8, i.e. the inner permanent magnet array 616 becomes the most outward component, the pole-piece array 612 is positioned inwards from the permanent magnet array 616, the high-speed rotor 606 is positioned inwards from the pole-piece array 612 and the stator 602 becomes the most inward component.

Figure 9:
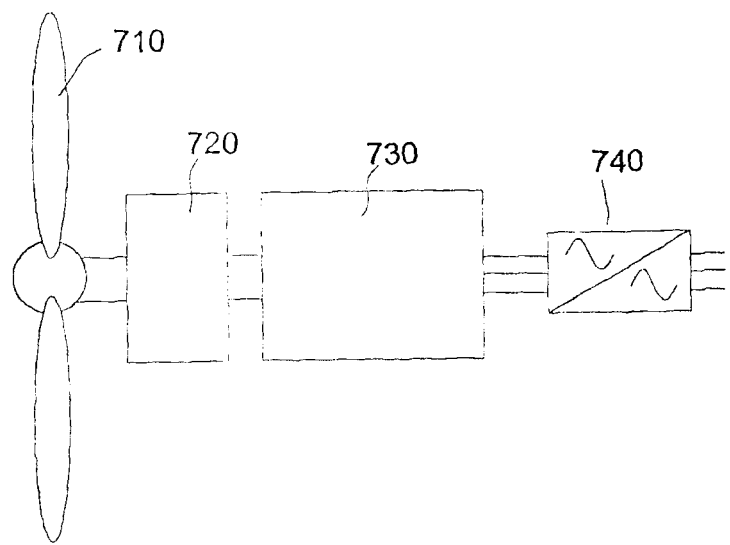
FIG. 9 shows an application of embodiments of the present invention to a wind turbine.

As discussed above, embodiments of the present invention are particularly suited to use with turbines which generate torque at varying power levels, such as wind turbines. FIG. 9 shows a wind turbine operating with an embodiment of the present invention comprising blades 710 for being rotated by the wind, a primary gear stage 720, although it will be realised that this is not essential, an embodiment of the present invention 730 arranged as an electro-mechanic generator for converting rotation of the blades 710 to electrical energy and power electronics 740 for connecting the output of the generator 730 to an electrical supply network.

The power electronics 740 are arranged to convert the generated electrical energy at a variable frequency to electrical energy at the frequency of the electrical supply network i.e. 50/60 Hz as appropriate. For example, the power electronics could be configured as a combination of a passive rectifier with an active inverter. Advantageously, the number of poles on the high-speed rotor of the generator 730 does not need to be selected to match the frequency of the generated electrical energy to the frequency of the power supply network and reactive power flow to and from the power supply network can be controlled by the power electronics 740 and does not directly affect the generator 730. Although FIG. 9 shows the use of the present invention with reference to wind power generation, the invention could equally be used with other power sources, such as wave energy, tidal power, combustion engines, gas turbines, etc.

In another embodiment, direct coupling of the generator 730 to the electrical network is possible when the prime mover operates at a constant speed. Such prime movers are suitable wind turbines, gas turbines, internal combustion engines e.g. diesel engines etc. In this case, the number of magnetic poles on the high-speed rotor of the generator 730 must be selected such that an internal gear ratio is achieved within the generator which results in the required rotational speed of the high-speed rotor such that the frequency of the generated electrical energy matches that of the electrical supply network e.g. 50 Hz. Further, current in the rotating windings must be controlled to regulate reactive power flow to and from the electrical power network and the voltage of the generated power. The fixed grid frequency is directly coupled to the speed of the high-speed rotor of the generator, which is coupled to the speed of the output rotor via the gear ratio, such that the prime-mover must rotate at a constant speed. Small deviations from constant speed, however, may be allowed due to the. compliance of the internal magnetic gear and the inertias of the rotors.

It will be appreciated that embodiments of the invention have been described with reference to electrical machines. One skilled in the art appreciates that such electrical machines can be used as motors or generators. When so-used, applying a 3-phase supply to the windings results in a geared electrical motor. However, rotating one of the rotors 102/106, 202/206, 302/306, 402/406, 502/506, 612/606 results in the electrical machine being used as a geared generator. Furthermore, although the above embodiments have been described with reference to using a 3-phase winding, embodiments are not limited to such an arrangement. Embodiments can be realised in which some other form of winding such as, for example, a 2-phase windings, is used.

Figure 10:
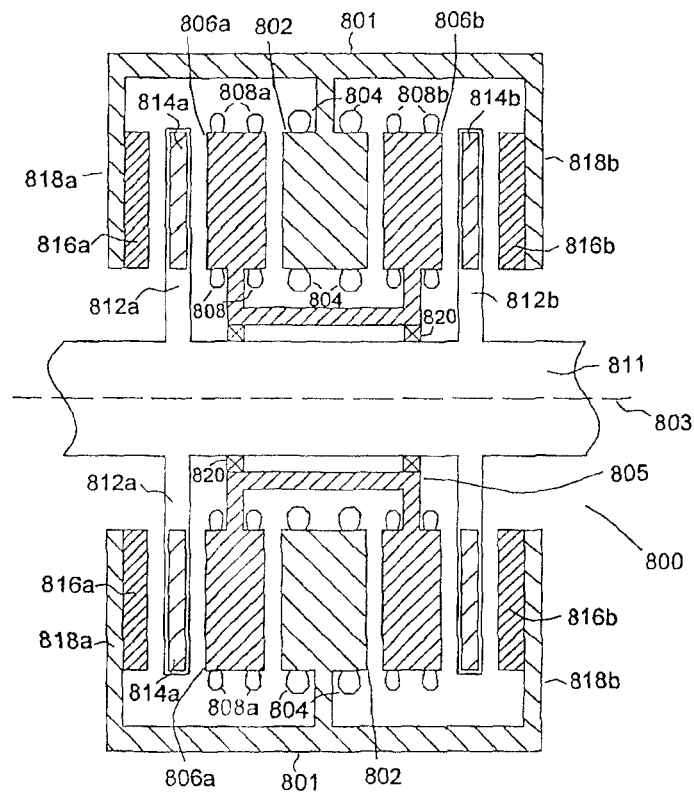
FIG. 10 shows a combined electrical machine and magnetic gear according to a seventh preferred embodiment.

Embodiments of the present invention can also be realised in the form of axial field rotary electrical machines. An axial-field rotary embodiment of the invention is shown in FIG. 10.

The electrical machine 800 comprises a stator 801, a high-speed rotor 805 and a low-speed, output rotor 811, which are axi-symmetric around axis 30 803. Outer discs 818a and 818b are attached to the stator, to which permanent magnet arrays 816a and 816b are connected. The stator has a further disc 802 to which windings 804 are connected. The low speed output rotor 811 is connected to two discs 812a and 812b, which both contain a number of pole-pieces 814a and 814b. The high-speed rotor 805 is provided with two discs 806*a* and 806*b*, which are positioned between the static disc 802 and discs 812*a*, 812*b*, which contain the pole-pieces. Discs 806*a* and 806*b* are provided with electrical windings 808*a* and 808*b*.

It will be understood that the seventh embodiment is an axial-field equivalent to the sixth embodiment which was shown in FIG. 8. The seventh embodiment is shown to be symmetric around a symmetry plane which cuts through the centre of disc 802 and is perpendicular to the symmetry axis 803. The components which are symmetric to one another have been referred to in FIG. 10 with identical numbers but with different indices a) and b). Such a symmetric embodiment has the advantage that the axial forces on each component cancel, such that no net axial force is exerted on any component of the shown embodiment, and inexpensive bearing system can be used. However, it will be understood that the shown embodiment can equally operate without this symmetry, as can be achieved by, for example, omitting all parts in FIG. 10 with index b), although a more robust and expensive bearing system will result. The principle of the shown embodiment is unaltered if the pole-pieces 814 are connected to the stator, with the permanent magnets 816 connected to the output rotor. The principle of the shown embodiment is also unaltered if the stator magnets 816 are attached to another part of the stator, such as to the central disc 804. With reference to previous figures, the invention extends to embodiments in which the windings 808 and/or the permanent array 818 are replaced by a combination of windings and permanent magnets.

Figure 11:
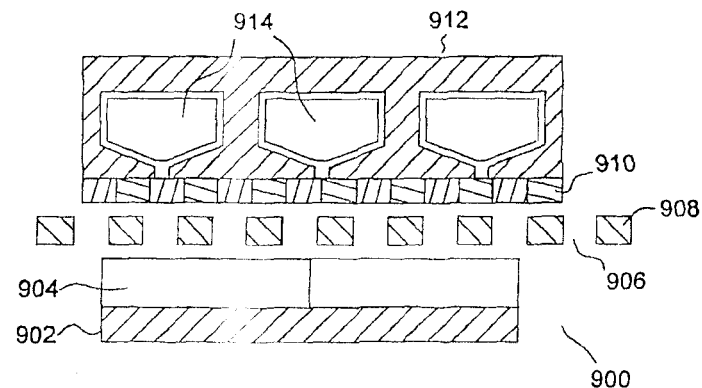
FIG. 11 shows a combined electrical machine and magnetic gear according to an eight preferred embodiment.

Embodiments of the present invention can also be realised in the form of linear translating electrical machines, either planar or tubular. A linear translating embodiment of the invention is shown in FIG. 11.

The electrical machine 900 comprises a stator 912 which has electrical windings 914 and permanent magnets 910 attached to it. The output translator 906 contains a plurality of pole-pieces 908. The high-speed translator 902 contains a plurality of windings 904. As discussed with previous embodiments, the windings 904 and/or the permanent magnet array 910 may be replaced by a combination of electromagnets and permanent magnets.

The invention claimed is:

1. An electrical machine comprising:
    a first rotor/translator having an associated set of electromagnets exhibiting a respective first number of pole-pairs;
    a set of permanent magnets having a respective second number of pole-pairs such that the first and second numbers of pole-pairs are different;
    a plurality of pole-pieces arranged to modulate the fields of the sets of electromagnets and permanent magnets to produce mutually matching pole-pairs enabling magnetic coupling and hence torque transmission between the sets of electromagnets and permanent magnets;
    a winding selected to magnetically couple with a first harmonic of the set of electromagnets of the first rotor/translator; and
    a controller arranged to control a current provided to the set of electromagnets to maintain a load angle between the field generated by the set of electromagnets and the field generated by the set of permanent magnets and the plurality of pole-pieces in the range of 60° to 120°, wherein the controller is further arranged to, when the electrical machine is producing a torque less than the maximum torque of the electrical machine, reduce the current provided to the set of electromagnets to increase the load angle.

2. The electrical machine as claimed in claim 1, wherein the set of permanent magnets and a multi-phase winding are mounted on a stationary armature.

3. The electrical machine as claimed in claim 1, wherein the plurality of pole-pieces are mounted on a second moveable rotor/translator.

4. The electrical machine as claimed in claim 3, wherein the second rotor/translator bearing the plurality of pole-pieces is arranged to move at a speed that is lower than a speed at which the first rotor/translator moves.

5. The electrical machine as claimed in claim 1, wherein the plurality of pole-pieces and a multi-phase winding are mounted on a stationary armature.

6. The electrical machine as claimed in claim 1, wherein the set of permanent magnets are mounted on a second moveable rotor/translator.

7. The electrical machine as claimed in claim 6, wherein the second rotor/translator bearing the plurality of permanent magnets is arranged to move at a speed that is lower than that at which the first rotor/translator moves.

8. The electrical machine as claimed in claim 1, wherein the first rotor/translator comprises a first moveable rotor, and the first moveable rotor, a second moveable rotor, and a stationary armature are cylindrically shaped, and concentrically disposed relative to an axis of rotation thereby forming a radial field rotary electrical machine.

9. The electrical machine as claimed in claim 1, wherein the first rotor/translator comprises a first moveable rotor, and the first moveable rotor, a second moveable rotor, and a stationary armature are at least one of annular or disc shaped, and axially disposed along the axis of rotation thereby forming an axial field rotary electrical machine.

10. The electrical machine as claimed in claim 1, wherein the first rotor/translator comprises a first moveable translator, and the first moveable translator, a second moveable translator, and a stationary armature are cylindrically shaped, and concentrically disposed relative to their direction of motion thereby forming a linear electrical machine.

11. The electrical machine as claimed in claim 1, wherein the first rotor/translator comprises a first moveable translator, and the first moveable translator, a second moveable translator, and a stationary armature are planar, and disposed relative to each other in a direction which is perpendicular to their direction of motion thereby forming a linear electrical machine.

12. The electrical machine as claimed in claim 1, wherein the first number of pole-pairs of the magnetic field that is associated with the first rotor/translator is selected to match a mechanical speed of the first rotor/translator to a frequency of an electrical supply of the electrical machine.

13. The electrical machine as claimed in claim 1, wherein the first rotor/translator having an associated set of electromagnets carries a combination of permanent magnets and windings forming the set of electromagnets.

14. A method of operating an electrical machine comprising the steps of:
    energizing electromagnets associated with a first moveable element to produce a magnetic field;
    modulating the magnetic field associated with the first moveable element to produce a magnetically motivated geared interaction between the first moveable element and a second moveable element;
    energizing a winding arranged to interact with the magnetic field associated with the first moveable element; and
    controlling a current provided to the electromagnets to maintain a load angle between the field generated by the electromagnets and a field associated with the second moveable element in the range of 60° to 120°, wherein the controller is further arranged to, when the electrical machine is producing a torque less than the maximum torque of the electrical machine, reduce the current provided to the electromagnets to increase the load angle.

15. The method as claimed in claim 14, further comprising determining a level of the magnetic field to be generated which is associated with the first moveable element.

16. A method of operating an electrical machine including electromagnets arranged on a first moveable element, permanent magnets, and a plurality of pole-pieces arranged to modulate the fields of the electromagnets and the permanent magnets to produce mutually matching pole-pairs enabling magnetic coupling and hence torque transmission between the electromagnets and the permanent magnets, the method comprising:

supplying a first value of current to the electromagnets in a first mode of operation for use at a first torque loading, the first torque loading producing a first torque; and when the electrical machine is producing a second torque less than the first torque, reducing the first value to a second, lower value and supplying current to the electromagnets in a second mode of operation for use at a second torque loading, thereby increasing a load angle between the field generated by the electromagnets and the field generated by the permanent magnets and the plurality of pole-pieces.

17. The method of claim 16, further comprising controlling the current provided to the electromagnets to maintain the load angle between the field generated by the electromagnets and the field generated by the permanent magnets and the plurality of pole-pieces included in the electrical machine in the range of 60° to 120°.

* * * * *